United States Patent
Yim

(10) Patent No.: US 10,313,100 B2
(45) Date of Patent: Jun. 4, 2019

(54) METHOD AND APPARATUS FOR AUTOMATIC SKEW COMPENSATION

(71) Applicant: ISMEDIA CO., LTD., Anyang-si, Gyeonggi-do (KR)

(72) Inventor: Sung-Oh Yim, Gwangmyeong-si (KR)

(73) Assignee: ISMEDIA CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/554,867

(22) PCT Filed: Apr. 5, 2016

(86) PCT No.: PCT/KR2016/003533
§ 371 (c)(1),
(2) Date: Aug. 31, 2017

(87) PCT Pub. No.: WO2016/171414
PCT Pub. Date: Oct. 27, 2016

(65) Prior Publication Data
US 2018/0041330 A1    Feb. 8, 2018

(30) Foreign Application Priority Data
Apr. 22, 2015 (KR) .................. 10-2015-0056839

(51) Int. Cl.
*H04L 7/04* (2006.01)
*H04L 7/00* (2006.01)
(Continued)

(52) U.S. Cl.
CPC ........ *H04L 7/0041* (2013.01); *G06F 13/4072* (2013.01); *H04L 25/14* (2013.01); *H04L 7/04* (2013.01)

(58) Field of Classification Search
CPC ....... H04L 7/0008; H04L 7/0041; H04L 7/04; H04L 7/0037; H04L 7/0338;
(Continued)

(56) References Cited

U.S. PATENT DOCUMENTS 5,867,541 A * 2/1999 Tanaka .................. H04L 7/0337
370/516
7,209,178 B1 4/2007 Lee et al.
(Continued)

FOREIGN PATENT DOCUMENTS

JP    2012-222733 A    11/2012
JP    2014-168195 A    9/2014
(Continued)

*Primary Examiner* — Emmanuel Bayard
(74) *Attorney, Agent, or Firm* — Rabin & Berdo, P.C.

(57) ABSTRACT

The present invention relates to a method and an apparatus for automatic skew compensation. The apparatus according to the present invention comprises: a skew compensating part configured to receive a high speed data signal and output a plurality of delay data signals having different delay times; a start code detecting part configured to detect a start code from the plurality of delay data signals; and a control part configured to determine a skew delay time depending on signal reception quality which is determined on the basis of the number of start codes normally detected for each different delay time. The apparatus may further comprise a packet start detecting part configured to receive an LP signal separated from an MIPI D-PHY and count the number of received packets. The packet start detecting part receives the LP signal separated from the MIPI D-PHY, and counts the number of packets received at every preset quality evaluation time by detecting the start location of a packet according to the state of the LP signal. The signal reception quality is obtained using the number of normally detected start codes and the number of received packets received and counted at every quality evaluation time. The present invention can
(Continued)

automatically compensate the skew between a data signal and a clock signal in an MIPI D-PHY reception system.

18 Claims, 8 Drawing Sheets

(51) Int. Cl.
*G06F 13/40* (2006.01)
*H04L 25/14* (2006.01)

(58) Field of Classification Search
CPC ............ H04L 7/0004; H04L 25/03019; H04L 27/2272; H04L 7/0033
USPC .................................................. 375/371–376
See application file for complete search history.

(56) References Cited

U.S. PATENT DOCUMENTS

| | | | |
|---|---|---|---|
| 8,516,345 B2 | 8/2013 | Quere et al. | |
| 8,817,184 B1* | 8/2014 | Amirkhany | H04N 5/04 348/194 |
| 8,855,498 B2 | 10/2014 | Tanaka et al. | |
| 8,886,988 B2 | 11/2014 | Lin et al. | |
| 2002/0091885 A1* | 7/2002 | Hendrickson | H03L 7/0814 710/100 |
| 2003/0131301 A1* | 7/2003 | Shimono | H04L 7/04 714/752 |
| 2004/0068682 A1* | 4/2004 | Takei | G11B 20/14 714/700 |
| 2004/0125902 A1* | 7/2004 | Nishimura | H03K 5/082 375/371 |
| 2004/0223566 A1* | 11/2004 | Yamashita | H04L 7/00 375/354 |
| 2007/0050658 A1* | 3/2007 | Kuwata | H04L 7/0008 713/503 |
| 2009/0207895 A1* | 8/2009 | Park | G11C 7/1003 375/219 |
| 2011/0037758 A1* | 2/2011 | Lim | H03L 7/0805 345/213 |
| 2011/0239084 A1* | 9/2011 | Abbasfar | G06F 11/1004 714/758 |
| 2013/0214833 A1* | 8/2013 | Kim | G11C 7/1066 327/156 |
| 2014/0176208 A1* | 6/2014 | Yamaguchi | H04L 7/00 327/158 |
| 2014/0241465 A1* | 8/2014 | Itoigawa | H04L 25/0272 375/316 |
| 2015/0043689 A1 | 2/2015 | Blon et al. | |
| 2015/0192949 A1* | 7/2015 | Wu | H04L 7/0004 713/503 |
| 2015/0229467 A1* | 8/2015 | Lee | H04L 7/0016 375/371 |
| 2016/0261435 A1* | 9/2016 | Musah | H04L 25/03019 |
| 2017/0195111 A1* | 7/2017 | Takahashi | G06F 13/42 |

FOREIGN PATENT DOCUMENTS

| | | |
|---|---|---|
| JP | 2014-526211 A | 10/2014 |
| KR | 10-2006-0083391 A | 7/2006 |
| KR | 10-2011-0039424 A | 4/2011 |

\* cited by examiner

METHOD AND APPARATUS FOR AUTOMATIC SKEW COMPENSATION

FIELD OF THE INVENTION

The present disclosure relates to a method and an apparatus for automatic skew compensation, and more particularly, to a method and an apparatus for automatic skew compensation between a data signal and a clock signal in a MIPI D-PHY reception system.

BACKGROUND ART

In recent years, rapidly improving performance of the mobile devices and the convergence of the components of various functions and performances have necessitated cooperation between appropriate interfaces. MIPI is an abbreviation of "Mobile Industry Processor Interface" and was established to define the interface between respective components that constitute a mobile device.

In MIPI, a serial method is mainly used for interfacing between the internal devices of the mobile device. In order to simplify the hardware configuration using a serial method and to enable a high-speed interface, a differential pair method is used. There are two types of serial interface of this differential pair type used in MIPI, which are: D-PHY and M-PHY. D-PHY is mainly used for cameras or LCD displays, and M-PHY is used for a higher-speed interface such as WiFi.

FIG. 1 is a diagram provided to explain a signal mode in the MIPI D-PHY, and FIG. 2 is a diagram illustrating an Analog-PHY block of the MIPI D-PHY.

As illustrated in FIG. 1, in the MIPI D-PHY specification, one single physical line is used with a combination of two modes of LP (Low Power) mode and HS (High Speed data) mode, and a signal is transmitted while mode changes.

In the MIPI D-PHY specification, LP (Low Power) section and HS (High Speed data) section are precisely divided, and in the MIPI D-PHY, the signals that would otherwise be mixed in the MIPI D-PHY are separated into an LP signal and an HS signal, respectively, as shown in FIG. 2.

However, there is a problem that, as the MIPI transmission rate increases, the clocks and the transmission delay of each data signal line are not constant for each of the signals depending on the environment such as line length, impedance matching, and so on at the transmission end. Therefore, there is a problem of receiving incorrect data when receiving MIPI data at the receiving end.

In the MIPI D-PHY specification, the LP signals are slow section where no skew compensation would be necessary, such that the starting and ending of the packet data transmitted in the HS section can be accurately checked according to the state of the LP signals. On the other hand, the HS section in which the actual packet data is transmitted is where high-speed packet data is transmitted, and accordingly, presence of a skew difference between the clock signal and each data signal will make reception of normal packet data impossible. Accordingly, a skew correction is indispensable.

Generally, the MIPI D-PHY reception system employs a method of manually compensating the skew of each signal at the transmitting end or the receiving end in order to compensate the skew between the data signal and the clock signal.

In order to solve this skew problem in high-speed transmission, a MIPI system after the MIPI D-PHY 1.2 specification is added with a function, in which pattern data for deskew purpose is included in each of the MIPI packets at the transmitting end so that the receiving end receiving the corresponding pattern data automatically compensates the skew in real time with the evaluation process.

However, for a MIPI system that does not support the deskew function of the MIPI D-PHY 1.2, skew cannot be compensated or has to be compensated manually which can be inconvenient. On the other hand, a method of adjusting and compensating the skew at the transmitting end, and a method of manually adjusting the clock signal or the skew of the data signal every time at the receiving end also have shortcomings, because a possible abnormality in the received data has to be checked with the process of adjusting one step at a time according to the number of skew steps defined according to each transmitting end, which takes a considerable amount of time until normal data is received.

DETAILED DESCRIPTION OF THE INVENTION

Technical Problem

Accordingly, it is an object of the present disclosure to provide a method and an apparatus for automatically compensating a skew between a data signal and a clock signal in a MIPI D-PHY reception system.

Technical Solution

According to an embodiment of the present disclosure for solving the aforementioned technical problems, an apparatus for skew delay compensation may include a skew adjusting part configured to receive a high-speed data signal and output a plurality of delayed data signals having different delay times from each other; a start code detecting part configured to detect a start code from the plurality of delayed data signals; and a control part configured to determine a skew delay time according to a signal reception quality determined based on a number of normally-detected start codes for each of the different delay times.

The apparatus may further include a packet start detecting part configured to receive an LP (Low Power) signal separated from an MIPI D-PHY and counts a number of received packets.

The packet start detecting part may receive the LP signal separated from the MIPI D-PHY, and count the number of packets received for each of set quality evaluation times by detecting a start location of the packet based on a state of the LP signal, and the signal reception quality may be obtained by using the number of normally-detected start codes and the number of received packets received and counted for each of the quality evaluation times.

The skew adjusting part includes a plurality of skew delay modules configured to delay an input signal by $\Delta t$ and output the same, and the plurality of skew delay modules are connected in series. Among the plurality of skew delay modules, n-th skew delay module may delay the received high speed data signal by $n\Delta t$ and output the same.

The apparatus may further include a signal selecting part configured to select one of the plurality of delayed data signals outputted from the skew adjusting part according to a skew control signal and outputting the selected signal.

The apparatus may further include a serial-to-parallel converting part configured to convert the delayed data signal outputted from the signal selecting part as serial data into parallel data in byte units and outputting the converted signal.

The apparatus may further include a plurality of serial-to-parallel converting part configured to receive, as an input, the plurality of delayed data signals outputted as serial data from the skew adjusting part, respectively, and convert the inputted signal into parallel data in byte units and output the converted signal, The start code detecting part may include a plurality of start code counters configured to be respectively inputted with the parallel data in byte units outputted from the plurality of serial-to-parallel converting parts and detect a start code.

The apparatus may further include a signal selecting part configured to select one of data signals outputted from the plurality of serial-to-parallel converting parts according to a skew control signal and output the selected signal.

The control part may perform ECC (Error Correction Code) or CRC (Cyclic Redundancy Check) verification for the packet data obtained with the determined skew delay time.

In order to achieve the technical objectives mentioned above, a method for skew delay compensation according to an embodiment of the present disclosure is provided, which may include: receiving a high-speed data signal and outputting a plurality of delayed data signals having different delay times from each other; detecting a start code from the plurality of delayed data signals; and determining a skew delay time according to a signal reception quality determined based on a number of normally-detected start codes for each of the different delay times.

The method may further include receiving an LP signal separated from an MIPI D-HY and counting a number of received packets.

The detecting the start code from the plurality of delayed data signals may include performing (a) selecting a signal from among the plurality of delayed data signals and outputting the selected signal, wherein the selected signal is the high-speed data signal delayed by NAT according to a skew control signal; (b) converting the outputted serial data signal delayed by NΔt into parallel data, and (c) receiving the parallel data and detecting the start code, in which the steps (a), (b), and (c) are repeated for a predetermined evaluation time sequentially for N from 0 to n (n is a natural number).

The detecting the start code from the plurality of delayed data signals may include repeating performing the following steps for a predetermined time: receiving the plurality of delayed data signals and converting the serial data signals into parallel data signals; detecting the start code from the converted parallel data signal; and increasing the number of detecting start codes for the delay time corresponding to the parallel data signal from which the start code is detected.

The method may further include performing ECC (Error Correction Code) or CRC (Cyclic Redundancy Check) verification for the packet data obtained with the determined skew delay time.

Effect

According to the present disclosure, skew between a data signal and a clock signal in the MIPI D-PHY reception system can be automatically compensated.

DETAILED DESCRIPTION OF THE INVENTION

Hereinafter, embodiments of the present disclosure will be described in detail with reference to the accompanying drawings so that those skilled in the art can easily carry out the present disclosure.

Figure 3:
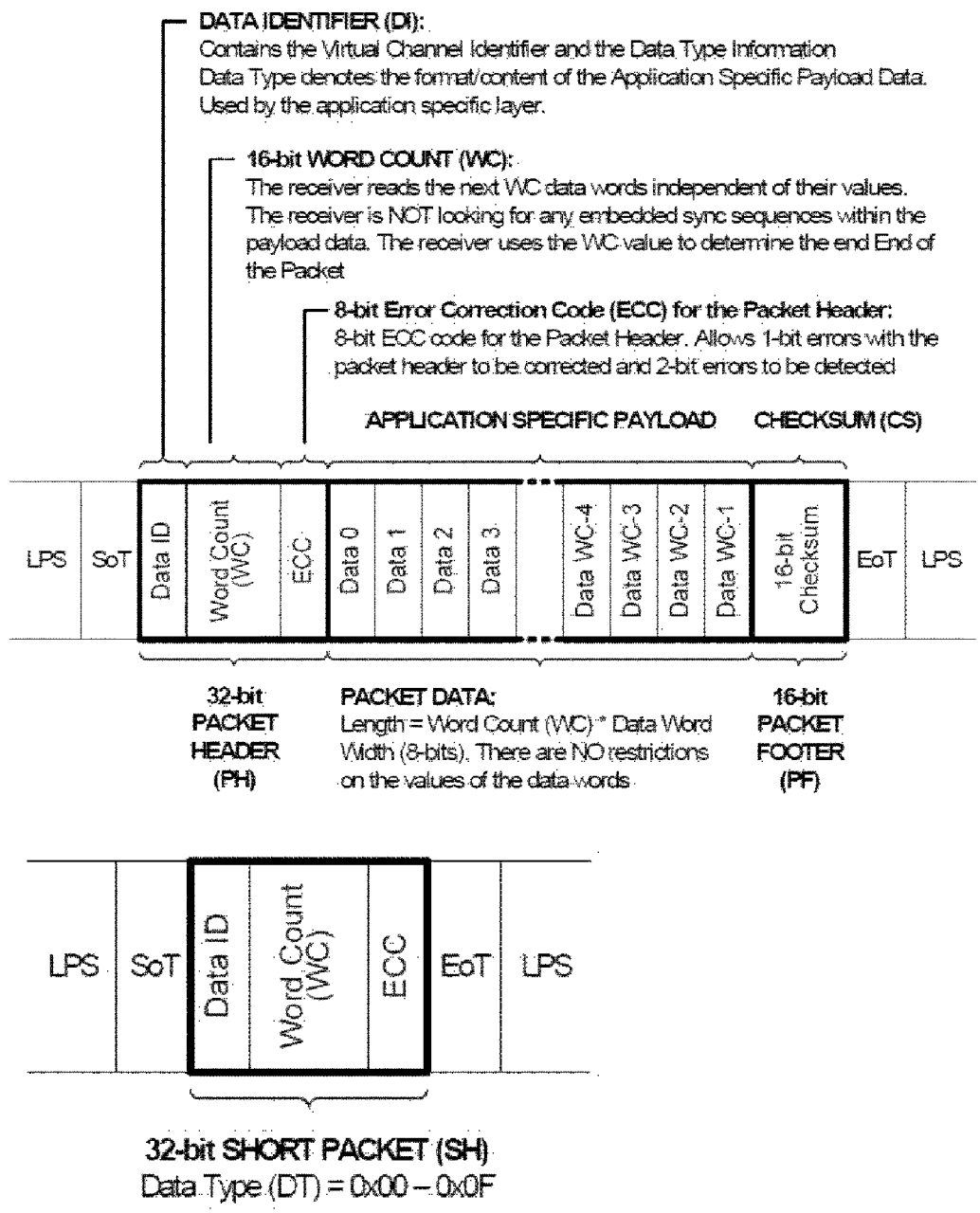
FIG. 3 is a diagram provided to explain an MIPI packet format.

FIG. 3 is a diagram provided to explain an MIPI packet format.

Referring to FIG. 3, the MIPI signal has the LPS (Low Power State) and a HS section between the LPS where the actual packet data is transmitted. The MIPI packet can be divided into two types: One is a type composed of a 32-bit packet header, packet data, a 16-bit packet footer; and the other is a type composed of a 32-bit short packet. In both packet types, a SoT (Start of Transmission) having a start code data value in the HS section is always positioned at the start location of the packet and is transmitted with the same data value. Therefore, the start code data value already known at the same position can be predicted.

Figure 1:
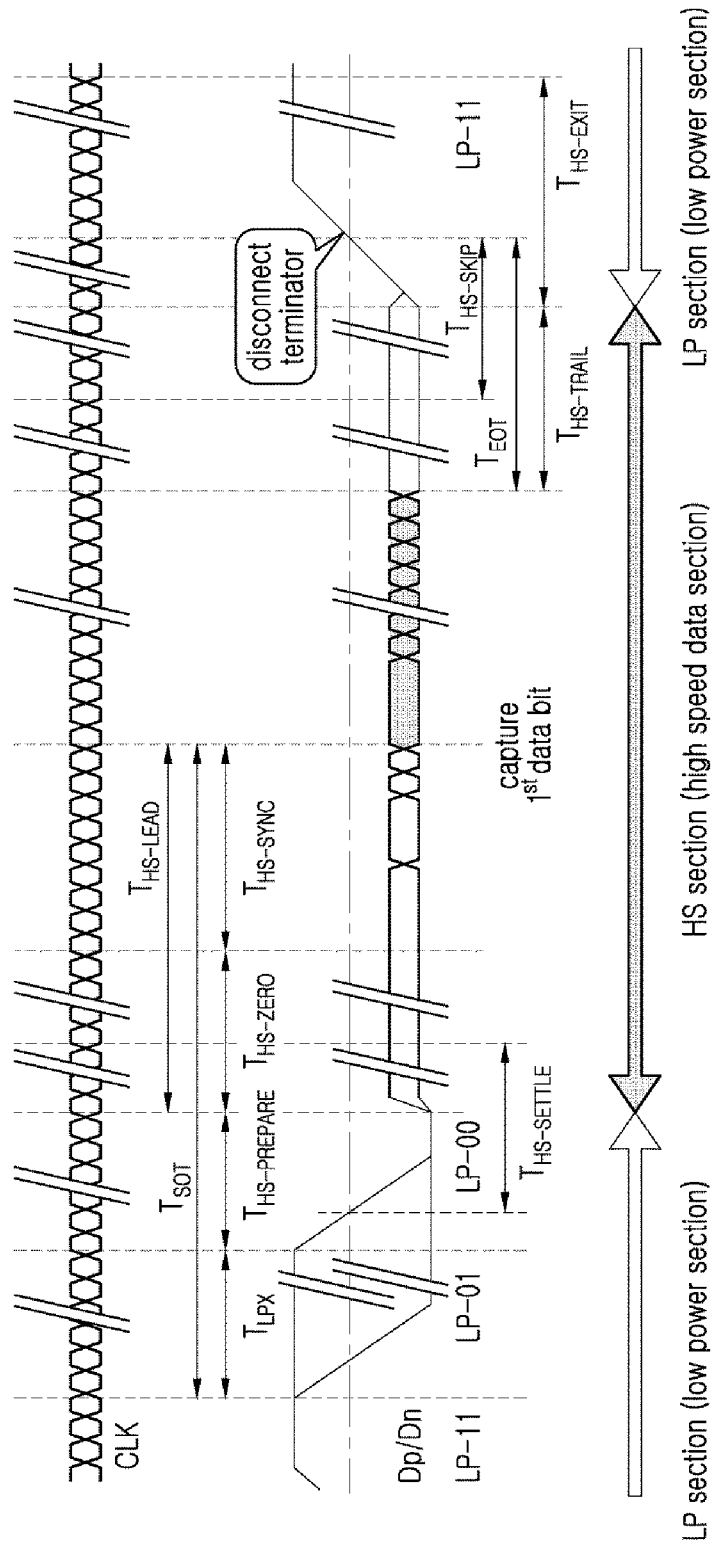
FIG. 1 is a diagram provided to explain signal modes in a MIPI D-PHY.
Figure 2:
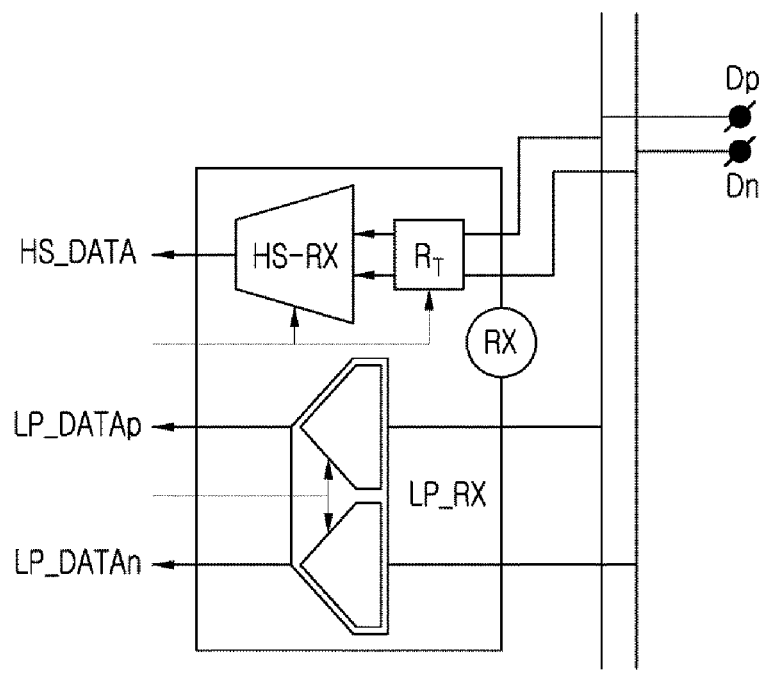
FIG. 2 is a diagram illustrating an Analog-PHY block of the MIPI D-PHY.

Also, the number of transmitted packets can be accurately counted based on the state of the LP section. As illustrated in FIG. 1, the transmitted MIPI signal is in a form of the LP signal combined with the HS signal. As illustrated in FIG. 2, in the Analog-PHY of the MIPI D-PHY, the MIPI signals Dp and Dn are received and separated into LP data signals (LP_DATAp and LP_DATAn) and high speed (HS) data signal (HS_DATA).

The HS_DATA signal has a dual data rate transmission method that transmits two data at one clock of the MIPI clock, in which the MIPI clock operates at several hundred MHz or higher.

The LP data signal is a signal that operates at a frequency of several MHz or less, and in the signal waveform of FIG. 1, the states of the LP signal are briefly shown as three states in which LP-11, LP-01, and LP-00 repeat.

LP-11 is an LP section, i.e., LP-11 is the section where HS data is not transmitted, and the LP_DATAp and LP_DATAn signals are respectively '1' (high level). This is also referred to as a STOP state. LP-01 is a state in which an entry into the HS section from the LP section is notified, and LP_DATAp is '0' (low level), and LP_DATAn is '1' (high level).

LP-00 is a state in which the HS data transmission section is notified, and the LP_DATAp and LP_DATAn signals are respectively '0' (low level). In this section, the state changes to LP-11 (i.e., STOP state) after one data packet is transmitted, so that it is possible to determine exactly how many data packets have been received within a specific time.

The automatic skew compensation apparatus according to the present disclosure can automatically compensate the skew by utilizing the number of transmission packets that can be accurately counted based on the SoT (start code) and the state of the LP section located at the start location of the packet in the MIPI signal, as described above.

Hereinafter, the automatic skew compensation apparatus according to the present disclosure will be described in more detail.

Figure 4:
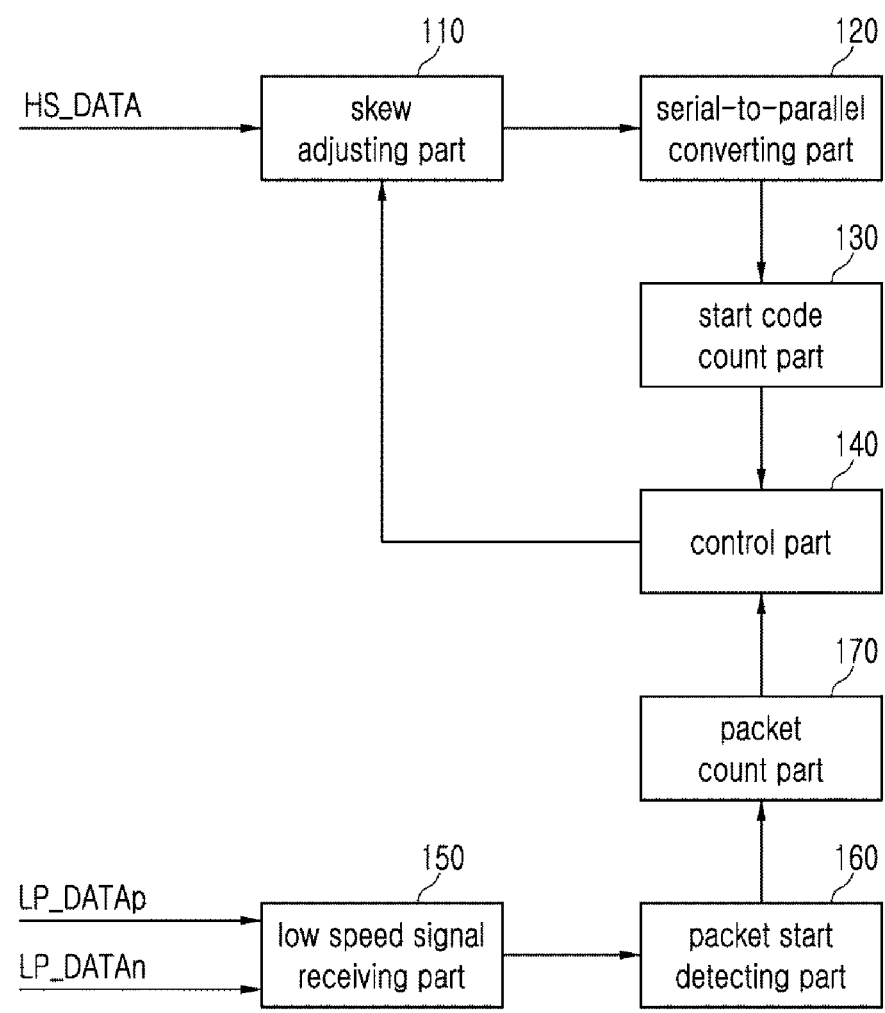
FIG. 4 is a block diagram showing a configuration of an automatic skew compensation apparatus according to an embodiment of the present disclosure.

FIG. 4 is a block diagram showing a configuration of an automatic skew compensation apparatus according to an embodiment of the present disclosure.

Referring to FIG. 4, the automatic skew compensation apparatus may include a skew adjusting part 110, a serial-to-parallel converting part 120, a start code count part 130, a control part 140, a low-speed signal receiving part 150, a packet start detecting part 160 and a packet count part 170.

The skew adjusting part 110 may output the high-speed data signal HS_DATA separated from the MIPI signal with different delay times from each other for each delay step. Accordingly, the skew adjusting part 110 may include a plurality of skew delay modules (not shown) for delaying an input signal by a predetermined time $\Delta T$ and outputting the delayed signal. The plurality of skew delay modules may be connected in series. The high-speed data signal HS_DATA sequentially passes through a plurality of skew delay modules and is output by increasing the delay time by $\Delta T$ every time it passes the skew delay module.

For example, when the skew adjusting part 110 is composed of n skew delay modules connected in series, the skew adjusting part 110 receives the high-speed data signal HS_DATA, and delays the signal so that (n+1) delayed data signals having different delay times from each other are outputted with a delay time '0', '$\Delta T$', '$2\Delta T$', ..., '$(n-1)\Delta T$', and '$n\Delta T$' for each of the delay steps N (N=0, 1, 2, n−1, n), respectively.

The serial-to-parallel converting part 120 receives the delayed data signal inputted as serial data, converts the delayed data signal into parallel data in byte units, and outputs the converted data. Since the MIPI signal is transmitted as 1-bit signal in series, it is necessary to process the data in parts of bytes (i.e., 8 bits). Accordingly, the serial-to-parallel converting part 120 according to the present disclosure sequentially receives 1-bit high-speed data signal HS_DATA, and converts it into 1-byte parallel data.

The start code count part 130 may detect a start code from the delayed data signal outputted from the serial-to-parallel converting part 120. The start code count part 130 may count the number of detecting start codes for each of the delay times '0', '$\Delta t$', '$2\Delta t$', '$(n-1) \Delta t$', '$n\Delta t$'.

For example, when the start code corresponding to the hexadecimal number 'B8' is detected normally from the heading part of the packet consisting of 1-byte unit parallel data, the start code count part 130 increases the number of detecting the start codes, for the delay time of the delayed data signal where the start code is normally detected (or for the delay step corresponding to that delay time). Of course, when the start code value is defined differently from 'B8' in the system, such differently-defined start code value may be detected. When the start code is not detected or when the start code is detected in a portion other than the start location of the packet, the start code detection is regarded as failed and the number of detecting start codes is not counted.

The low-speed signal receiving part 150 receives the low-speed data signals (LP_DATAp and LP_DATAn) separated from the MIPI signal and transfers it to the packet start detecting part 160.

The packet start detecting part 160 may analyze a specific state among the three states of low-speed data signals (LP_DATAp and LP_DATAn) which repeat LP-11, LP-01, and LP-00, and transmit the analyzed state to the packet count part 170.

The packet count part 170 may count the number of received packets and transfer it to the control part 140 every time the specific state of the three states LP-11, LP-01, and LP-00 is transferred from the packet start detecting part 160.

For example, every time the LP-01 state is detected in the low-speed data signal, the packet start detecting part 160 may transfer the LP-01 state to the packet count part 170 so that the packet count part 170 counts the number of received packets. Of course, another embodiment is also possible, in which the number of received packets is counted every time the LP-11 or LP-00 state is detected.

The control part 140 may evaluate the signal reception quality based on the start code reception ratio (S/P) obtained by dividing the number of detecting start codes (S) by the number of received packets (P) for each the delay steps. Further, the control part 140 may determine the skew delay time based on the delay time corresponding to the delay step having the highest reception ratio (i.e., best signal reception quality).

Alternatively, the control part 140 may compare the number of detecting start codes for each delay step, and determine the skew delay time based on the delay time corresponding to the delay step in which the largest number of start codes are detected. Of course, in this case, the counted number of detecting start codes are compared while the same number of packets are received for each delay step.

According to an embodiment of the present disclosure, by evaluating presence or absence of error in the received packets using an error correction code (ECC) or a cyclic redundancy check (CRC), and so on by applying a skew delay time determined using a number of detecting start codes, it is also possible to re-verify the skew delay time that is previously determined based on the number of detecting start codes.

The control part 140 may automatically perform the skew compensation by setting the skew adjusting part 110 with the finally determined skew delay time.

Two methods may be contemplated for a method for obtaining the signal reception quality for each delay step in the automatic skew compensation apparatus.

The first method is to sequentially obtain the signal reception quality for each of the delay steps, and the second method is to simultaneously obtain the signal reception quality in parallel for each of the delay steps.

Figure 5:
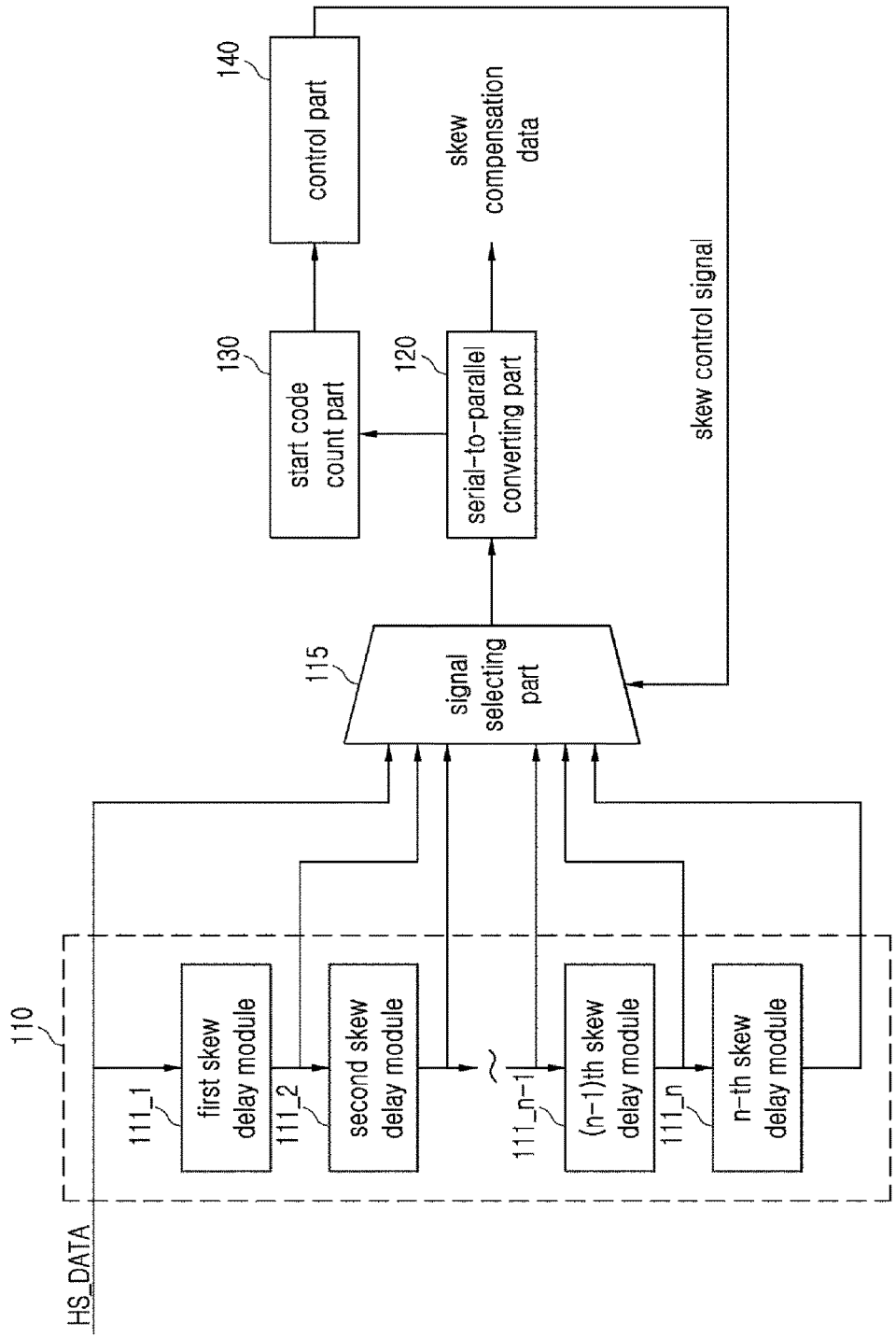
FIG. 5 is a block diagram provided to explain an automatic skew compensation apparatus for obtaining a signal reception quality sequentially according to a delay time according to an embodiment of the present disclosure.

FIG. 5 is a block diagram provided to explain an automatic skew compensation apparatus for obtaining a signal reception quality sequentially according to a delay time according to an embodiment of the present disclosure.

Referring to FIG. 5, the automatic skew compensation apparatus may further include a signal selecting part 115, in addition to the components illustrated in FIG. 4.

The skew adjusting part 110 may include a plurality of skew delay modules 111_1, 111_2, ..., 111_$n$−1, and 111_$n$. The plurality of skew delay modules 111_1, 111_2, ..., 111_$n$−1, and 111_$n$ may be connected in series.

In addition to outputting the high speed data signal HS_DATA immediately without a delay time, the skew adjusting part 110 also outputs delayed data signal which is the high-speed data signal HS_DATA delayed as it sequentially passes through the plurality of skew delay modules 111_1, 111_2, ..., 111_n−1 and 111_n. In this example, the delayed data signal also includes a high-speed data signal HS_DATA, which is the signal that is immediately outputted without a delay time '0' (that is, without delay time).

The signal selecting part 115 selects one of the plurality of delayed data signals outputted from the skew adjusting part 110. More specifically, the signal selecting part 115 selects a delayed data signal of the delay step corresponding to the skew control signal outputted from the control part 140 and outputs the selected signal. For example, when the skew control signal corresponding to the delay step '0' is inputted, the signal selecting part 115 selects the high-speed data signal HS_DATA and outputs the selected signal. When the skew control signal corresponding to the delay step 'n' is inputted, the signal selecting part 115 may select a signal that is outputted from the skew delay module 111_n with a delay of nΔt compared with the high speed data signal HS_DATA, and outputs the selected signal.

Hereinafter, the operation of the automatic skew compensation apparatus illustrated in FIG. 5 will be described in detail with reference to FIG. 6.

Figure 6:
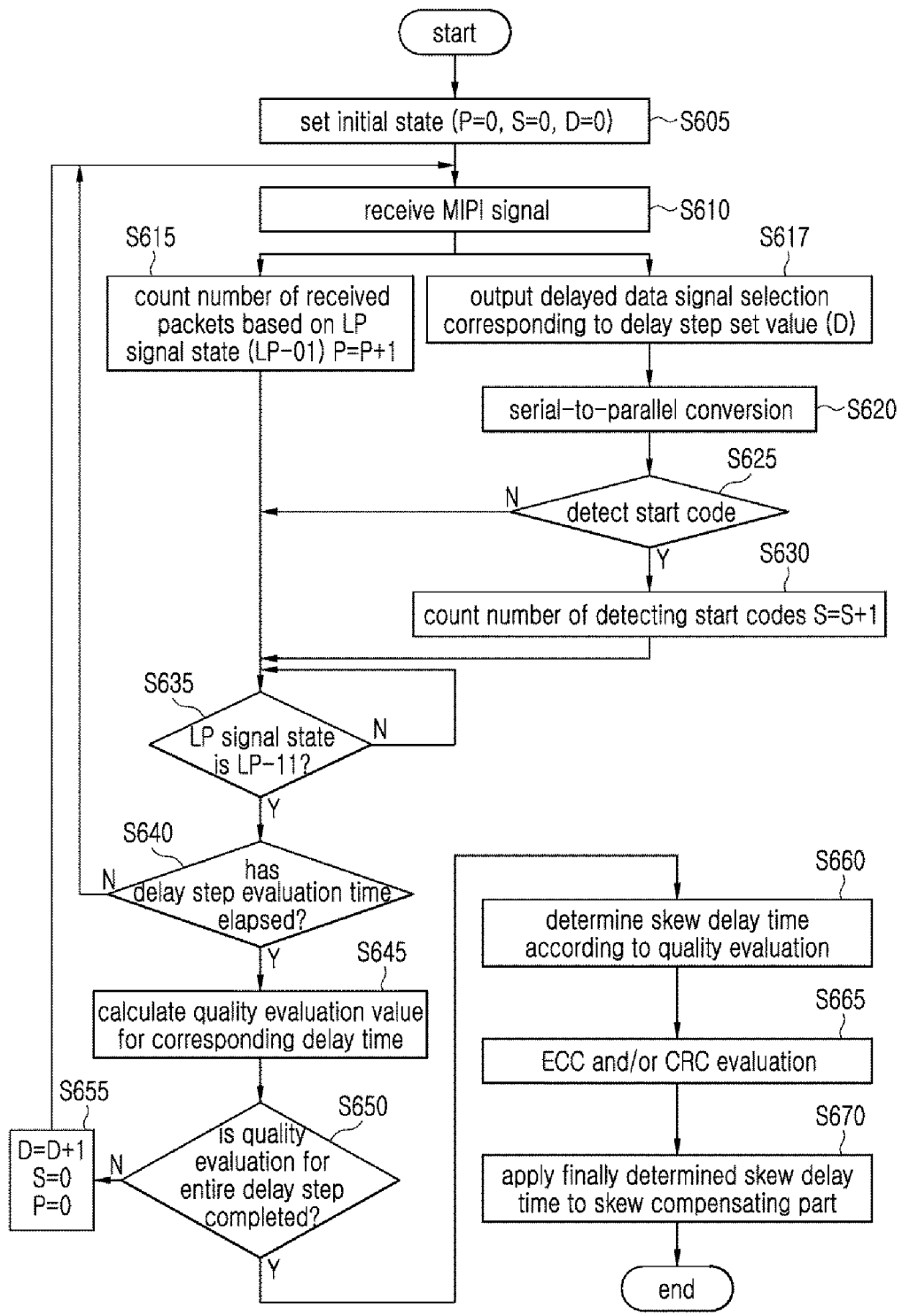
FIG. 6 is a flowchart provided to explain the operation of the automatic skew compensation apparatus illustrated in FIG. 5.

FIG. 6 is a flowchart provided to explain the operation of the automatic skew compensation apparatus illustrated in FIG. 5.

First, the control part 140 sets the automatic skew compensating apparatus to an initial state, at S605. The number (P) of received packets, the number (S) of detecting start codes, and the delay step set value (D) may be set to '0', respectively. Meanwhile, the automatic skew compensation apparatus may have a reception quality evaluation time for each delay step set in advance. In another embodiment, the number of reception quality evaluation packets may be set instead of the reception quality evaluation time.

When the automatic skew compensation apparatus receives the MIPI signal at S610, the packet count part 170 counts the number of received packets based on the state of the LP signal separated from the MIPI signal, at S615. When the LP signal state is 'LP-01' at S615, the number (P) of received packets may be increased by '1'.

Meanwhile, when the skew adjusting part 110 receives the high-speed data signal HS_DATA separated from the MIPI signal and outputs a plurality of delayed data signals having different delay times from each other ('0', 'Δt', '2Δt', '(n−1)ΔT', 'nΔt'), the signal selecting part 115 selects a delayed data signal having a delay time corresponding to the currently-set delay step set value D, and outputs the selected signal, at S617. Since the delay step set value D is initially set to '0', the high speed data signal HS_DATA is selected and outputted, and every time the delay step set value D increases by one, the delayed data signal corresponding thereto is selected and outputted.

Next, the serial-to-parallel converting part 120 converts the delayed data signal outputted from the signal selecting part 115 into parallel data, at S620.

The start code count part 130 then detects a start code from the delayed data signal outputted from the signal selecting part 115, at S625.

When the start code is normally detected at S625-Y, the start code count part 130 increases the start code count S by '1' at S630.

Next, when the state of the LP signal becomes 'LP-11' at S635, the control part 140 determines whether or not the evaluation time for each delay step has elapsed at S640. When the corresponding evaluation time for the delay step has not elapsed at S640-N, operations at S610 through S635 are repeated. For example, when the evaluation time is set to 10 μsec, the number of detecting start codes and the number of received packets are counted for 10 μsec for the corresponding delay step. The evaluation time for each delay step should be set to a time duration in which at least one packet can be received. If the evaluation time per delay step is set longer, the start code is detected with respect to more received packets and therefore, the reliability becomes higher, but the evaluation time becomes longer. If the evaluation time per delay step is set shorter, there is a problem that reliability becomes lower while the total time required for the evaluation becomes shorter. The evaluation time per delay step can thus be appropriately set as needed. Meanwhile, an embodiment is also possible in which the number of detecting start codes is counted for a corresponding delay step until a predetermined number of packets are received. For example, when the number of evaluation packets is set to 10, the operations at S610 through S635 may be repeated until the number of received packets becomes 10 for the corresponding delay step.

Meanwhile, when the evaluation time for the corresponding delay step has been elapsed at 640-Y, the control part 140 may calculate the signal reception quality evaluation value based on a ratio of the number of detecting start codes to the number of received packets for the corresponding delay step, at S645.

Next, when the quality evaluation for the entire delay steps is not completed at S650-N, the control part 140 increases the delay step set value D by '1', and changes the number (S) of detecting start codes and the number (P) of received packets back to '0', at S655.

When the quality evaluation for the entire delay steps is completed at S650-Y by reiteration of the operations at S610 to S655, the control part 140 determines skew delay time through the signal reception quality evaluation for each delay step according to a ratio of the number of detecting start codes to the number of received packets, at S660.

Next, at S665, it is also possible to re-verify the skew delay time previously determined based on the number of detecting start codes, by secondarily evaluating the presence or absence of an error in the packet data obtained based on the skew delay time determined at S660 using an ECC (Error Correction Code) or CRC (Cyclic Redundancy Check) and so on.

Finally, the control part 140 receives the MIPI packet data at S670, by applying the skew delay time, which has completed the error evaluation by the ECC and/or the CRC and so on, to the skew compensation part 110.

Figure 7:
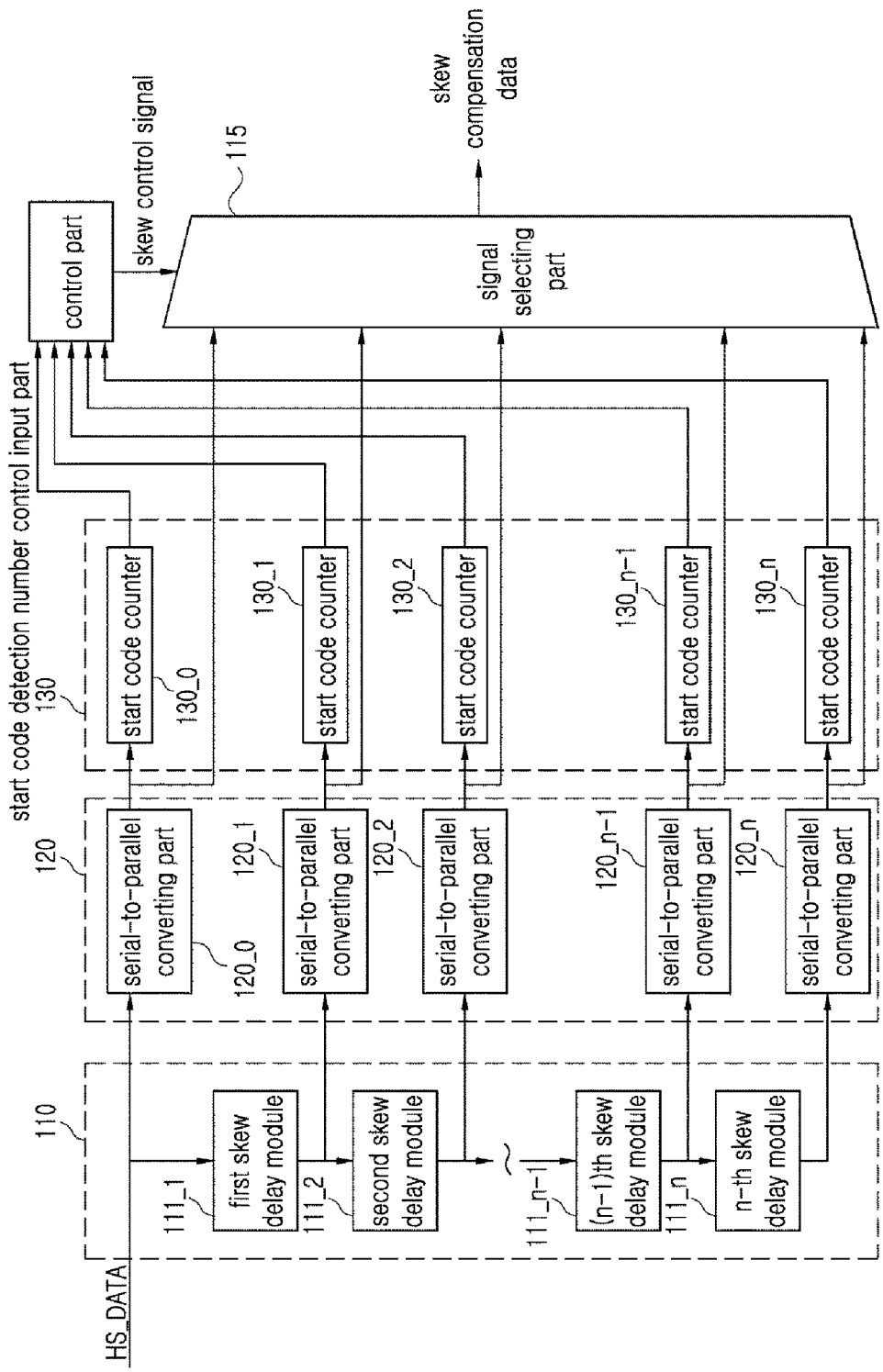
FIG. 7 is a block diagram provided to explain an automatic skew compensation apparatus for obtaining a signal reception quality simultaneously with respect to each delay time according to another embodiment of the present disclosure.

FIG. 7 is a block diagram provided to explain an automatic skew compensation apparatus for obtaining a signal reception quality simultaneously with respect to each delay time according to another embodiment of the present disclosure.

Referring to FIG. 7, the automatic skew compensation apparatus may further include a signal selecting part 115 in addition to the components illustrated in FIG. 4.

The skew adjusting part 110 may have the same configuration as that illustrated in FIG. 5.

The serial-to-parallel converting part 120 may include a plurality of parallel-to-serial converting parts 121_0, 121_1, 121_2, ..., 121_n−1, and 121_n arranged in parallel.

The plurality of serial-to-parallel converting parts 121_0, 121_1, 121_2, ..., 121_n−1, and 121_n are inputted with the high-speed data signal HS_DATA and delayed data signals that are delayed with increased delay time by Δt as it passes through the plurality of skew delay modules 111_1, 111_2, ..., 111_n−1, 111_n, and converts the received signal into parallel data and outputs the converted data.

The start code count part 130 may include a plurality of start code counters 131_0, 131_1, 131_2, ..., 131_n−1, 131_n arranged in parallel.

The plurality of start code counters 131_0, 131_1, 131_2, ..., 131_n−1 and 131_n detect and count the start codes from the delayed data signal as the delayed data signals converted into parallel data in the plurality of serial-to-parallel converting part 121_0, 121_1, 121_2, ..., 121_n−1 and 121_n are outputted.

The signal selecting part 115 receives the skew control signal from the control part 140, and outputs a skew compensation data signal which is the high-speed data signal delayed according to the skew delay time.

Figure 8:
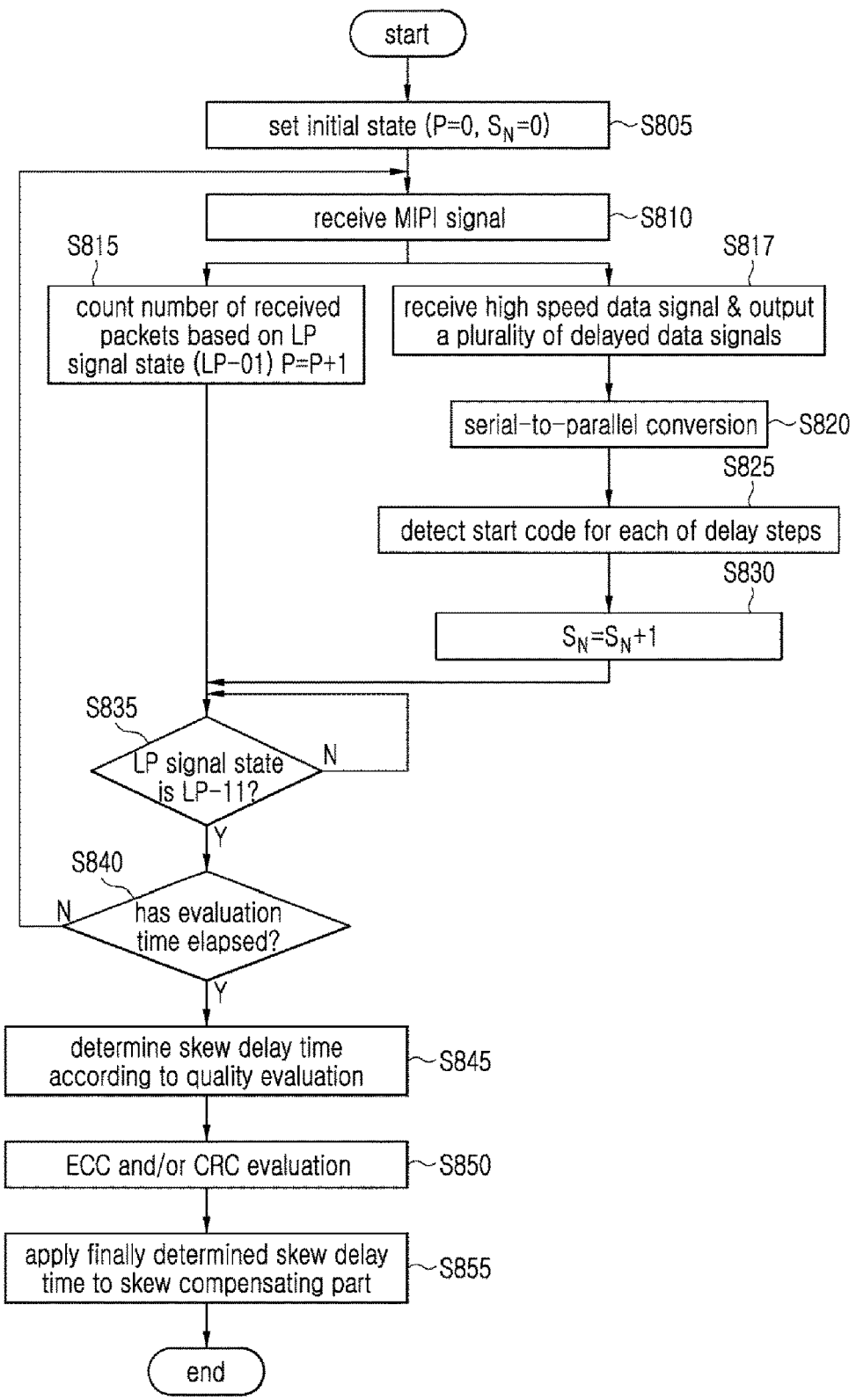
FIG. 8 is a flowchart provided to explain the operation of the automatic skew compensation apparatus illustrated in FIG. 7.

FIG. 8 is a flowchart provided to explain the operation of the automatic skew compensation apparatus illustrated in FIG. 7.

Referring to FIG. 8, first, the control part 140 sets the automatic skew compensation apparatus to the initial state at S805. The number (P) of received packets and the number ($S_N$) of detecting start codes for each delay step may be set to '0', respectively. Meanwhile, the automatic skew compensation apparatus may have a reception quality evaluation time set in advance. In another embodiment, the number of reception quality evaluation packets may be set instead of the reception quality evaluation time.

When the automatic skew compensation apparatus receives the MIPI signal at S810, the packet count part 170 counts the number of received packets based on the state of the LP signal separated from the MIPI signal, at S815. When the LP signal state is 'LP-01' at S815, the number (P) of received packets may be increased by '1'.

Meanwhile, the skew adjusting part 110 receives the high-speed data signal HS_DATA separated from the MIPI signal and outputs the plurality of delayed data signal having different delay times from each other ('0', 'Δt', '2Δt', '(n−1)ΔT', 'nΔt'), at 817.

Next, the plurality of serial-to-parallel converting parts 121_0, 121_1, 121_2, ..., 121_n−1, and 121_n convert the plurality of delayed data signals outputted from the skew adjusting part 110 into parallel data, respectively, at S820.

The plurality of start code counters 131_0, 131_1, 131_2, ..., 131_n−1 and 131_n detect start code for the plurality of delayed data signals outputted from the plurality of serial-to-parallel converting parts 121_0, 121_1, 121_2, ..., 121_n−1, 121_n respectively for each delay step, at S825.

When the start code is normally detected from the delayed data signal corresponding to the specific delay step, the start code counter 131_0, 131_1, 131_2, ..., 131_n−1, 131_n corresponding to the corresponding delay step increases the start code count by '1', at S830.

Next, when the state of the LP signal becomes 'LP-11' at S835, the control part 140 determines whether or not the evaluation time has elapsed, at S840. When the evaluation time has not elapsed at S840-N, operations at S810 through S835 are repeated. For example, when the evaluation time is set to 10 μsec, the operations at S810 through S835 are repeated for 10 μsec, with the number of detecting start codes being counted for each delay step. Meanwhile, in another embodiment, the number of detecting start codes may be counted for each delay step until a predetermined number of packets are received. For example, when the number of evaluation packets is set to 10, the operations at S810 through S835 may be repeated until the number of received packets becomes 10.

Meanwhile, when the evaluation time has elapsed at 840-Y, the control part 140 determines the skew delay time through the signal reception quality evaluation according to the number of detecting start codes for each delay step, at S845.

Next, at S850, it is also possible to re-verify the skew delay time previously determined based on the number of detecting start codes, by secondarily evaluating the presence or absence of an error in the packet data obtained based on the skew delay time determined at S845 using an ECC (Error Correction Code) or CRC (Cyclic Redundancy Check) and so on.

Finally, the control part 140 receives the MIPI packet data at S855, by applying the skew delay time, which has completed the error evaluation by the ECC and/or the CRC and so on, to the skew compensation part 110.

Embodiments of the present disclosure comprise a computer-readable medium having program instructions for performing various computer-implemented operations. This medium records a program for executing the skew automatic compensation method descried above. The medium may include program instructions, data files, data structures, and so on, either alone or in combination. Examples of such medium include a magnetic medium such as hard disk, floppy disk and magnetic tape, an optical recording medium such as CD and DVD, a magneto-optical medium, and a hardware device configured to store and carry out program instructions, such as ROM, RAM, flash memory, and so on. Further, such medium may be a transmission medium, such as optical or metal line, waveguide, and so on, including a carrier that transmits a signal for designating program instructions, data structure, and so on. Examples of program instructions include not only machine language code such as those generated by a compiler, but also high-level language code that can be executed by a computer using an interpreter, and so on.

While the present invention has been particularly shown and described with reference to exemplary embodiments thereof, it is to be understood that the invention is not limited to the disclosed embodiments, but rather intended to cover various modifications and equivalent arrangements included within the spirit and scope of the appended claims.

The invention claimed is:

1. An apparatus for skew delay compensation, comprising at least one computer configured to execute program instructions to implement:
    a skew adjusting part configured to receive a high-speed data signal and output a plurality of delayed data signals having different delay times from each other;
    a start code detecting part configured to detect a start code from the plurality of delayed data signals; and
    a control part configured to determine a skew delay time according to a signal reception quality determined based on a number of normally-detected start codes for each of the different delay times.

2. The apparatus according to claim 1, wherein the skew adjusting part comprises
    a plurality of skew delay modules configured to delay an input signal by ΔT and output the delayed signal,
    the plurality of skew delay modules are connected in series, and
    an n-th skew delay module among the plurality of skew delay modules delays the received high-speed data signal by nΔt and outputs the delayed signal.

3. The apparatus according to claim 2, further comprising a packet start detecting part configured to receive an LP (Low Power) signal separated from an MIPI (Mobile Industry Processor Interface) D-PHY and count a number of received packets.

4. The apparatus according to claim 3, wherein the packet start detecting part receives the LP signal separated from the MIPI D-PHY, and counts the number of packets received for each of set quality evaluation times by detecting a start location of each packet of the number of packets received for each of the set quality evaluation times based on a state of the LP signal, and the signal reception quality is obtained by using the number of normally-detected start codes and the number of received packets received and counted for each of the quality evaluation times.

5. The apparatus according to claim 2, further comprising a signal selecting part configured to select one of the plurality of delayed data signals outputted from the skew adjusting part according to a skew control signal and output the selected delayed data signal.

6. The apparatus according to claim 5, further comprising a serial-to-parallel converting part configured to convert the selected delayed data signal outputted from the signal selecting part as serial data into parallel data in byte units and output the converted signal,
and
wherein the start code detecting part detects the start code from the parallel data in byte units outputted from the serial-to-parallel converting part.

7. The apparatus according to claim 2, further comprising a plurality of serial-to-parallel converting parts configured to receive, as input signals, the plurality of delayed data signals outputted as serial data from the skew adjusting part, respectively, and convert the input signals into parallel data in byte units and output the converted input signals, wherein the start code detecting part comprises a plurality of start code counters configured to respectively receive the parallel data in byte units outputted from the plurality of serial-to-parallel converting parts and detect the start code.

8. The apparatus according to claim 7, further comprising a signal selecting part configured to select one of data signals outputted from the plurality of serial-to-parallel converting parts according to a skew control signal and output the selected signal.

9. The apparatus according to claim 8, wherein the control part performs ECC (Error Correction Code) or CRC (Cyclic Redundancy Check) verification for packet data obtained with the determined skew delay time.

10. A method for skew delay compensation, comprising:
receiving a high-speed data signal and outputting a plurality of delayed data signals having different delay times from each other;
detecting a start code from the plurality of delayed data signals; and
determining a skew delay time according to a signal reception quality determined based on a number of normally-detected start codes for each of the different delay times.

11. The method according to claim 10, wherein the detecting the start code from the plurality of delayed data signals comprises performing:
(a) selecting a signal from among the plurality of delayed data signals and outputting the selected signal as a serial data signal, wherein the selected signal is the high-speed data signal delayed by $N\Delta T$ according to a skew control signal;
(b) converting the outputted serial data signal delayed by $N\Delta t$ into parallel data, and
(c) receiving the parallel data and detecting the start code, wherein
the steps (a), (b), and (c) are repeated for a predetermined evaluation time sequentially for N from 0 to n (n is a natural number).

12. The method according to claim 11, further comprising receiving an LP (Low Power) signal separated from an MIPI (Mobile Industry Processor Interface) D-PHY and counting a number of received packets.

13. The method according to claim 12, comprising receiving the LP signal separated from the MIPI D-PHY, and counting the number of packets received for each of set quality evaluation times by detecting a start location of each packet of the number of packets received for each of the set quality evaluation times based on a state of the LP signal; and obtaining the signal reception quality using the number of normally-detected start codes and the number of packets received and counted for each of the set quality evaluation times.

14. The method according to claim 11, wherein the detecting the start code from the plurality of delayed data signals comprises repeating performing the following steps for a predetermined time:
receiving the plurality of delayed data signals as serial data signals and converting the serial data signals into parallel data signals;
detecting the start code from the converted parallel data signals; and
increasing a number of counts of detections of the start code for a delay time corresponding to a converted parallel data signal from which the start code is detected.

15. The method according to claim 14, further comprising performing ECC (Error Correction Code) or CRC (Cyclic Redundancy Check) verification for packet data obtained with the determined skew delay time.

16. The apparatus according to claim 5, wherein the control part performs ECC (Error Correction Code) or CRC (Cyclic Redundancy Check) verification for packet data obtained with the determined skew delay time.

17. The method according to claim 11, further comprising performing ECC (Error Correction Code) or CRC (Cyclic Redundancy Check) verification for packet data obtained with the determined skew delay time.

18. A non-transitory computer-readable medium storing program instructions executable by a computer to perform the method of claim 10.

* * * * *